United States Patent [19]

Miyao et al.

[11] Patent Number: 5,063,001
[45] Date of Patent: Nov. 5, 1991

[54] METHOD OF COMPACTING RADIOACTIVE METAL WASTES

[75] Inventors: Hidehiko Miyao, Katsuta; Satoshi Ikeda, Mito; Masao Shiotsuki, Mito; Shigeyoshi Kawamura, Mito; Fumiaki Komatsu, Kobe; Ikuji Takagi, Ibaraki; Tadamiti Sakai, Kobe, all of Japan

[73] Assignees: Kabushiki Kaisha Kobe Seiko Sho, Kobe; Doryokuro Kakunenryo Kaihatsu Jigyodan, Tokyo, both of Japan

[21] Appl. No.: 569,964

[22] Filed: Aug. 20, 1990

[30] Foreign Application Priority Data

Sep. 28, 1989 [JP] Japan .................................. 1-253857

[51] Int. Cl.$^5$ .............................................. G21C 21/00
[52] U.S. Cl. ..................... 264/0.5; 252/628; 252/633; 419/42; 419/57; 427/5; 427/6
[58] Field of Search ................... 252/628, 633; 427/5, 427/6; 264/0.5; 419/42, 57

[56] References Cited

U.S. PATENT DOCUMENTS

| | | | |
|---|---|---|---|
| Re. 33,243 | 6/1990 | Braun et al. | 264/0.5 |
| 3,787,321 | 1/1974 | Dahlen et al. | 250/106 R |
| 4,280,921 | 7/1981 | May | 252/301.1 W |
| 4,491,540 | 1/1985 | Larker et al. | 252/628 |
| 4,617,158 | 10/1986 | Braun et al. | 264/0.5 |
| 4,929,394 | 5/1990 | Kitagawa et al. | 252/633 |

Primary Examiner—Brooks H. Hunt
Assistant Examiner—Ngoclan T. Mai
Attorney, Agent, or Firm—Oblon, Spivak, McClelland, Maier & Neustadt

[57] ABSTRACT

A method of compacting radioactive metal wastes comprising enclosing the radioactive metal waste in vacuo in a capsule, placing the capsule into a pressure container, and subjecting the capsule to an increased pressure at a high temperature to compact the waste. The compacting treatment is conducted in a state in which the atmosphere within the pressure container contains water molecules in an amount, in terms of the total weight W (g) thereof, the amount being preferably in the range of:

$$1.3 \times 10^{-6} \times V \leq W$$

wherein V (cm$^3$) is the volume of the compacting space in the pressure container. Alternatively, an oxide coating is formed on the outer surface of the capsule before the capsule is placed into the pressure container, or the formation of the oxide coating is followed by the compacting treatment conducted in the above-mentioned state.

7 Claims, 3 Drawing Sheets

METHOD OF COMPACTING RADIOACTIVE METAL WASTES

BACKGROUND OF THE INVENTION AND RELATED ART STATEMENT

The present invention relates to a method of compacting radioactive metal wastes from nuclear reactors, such as fuel claddings of zircaloy and used metal materials of zirconium or zircaloy occluding tritium.

Use of a hot isostatic press (HIP) or hot press (HP) has already been proposed in compacting radioactive metal wastes such as zircaloy cladding hulls. The method employing the HIP is practiced by enclosing zircaloy cladding hulls in an HIP treating capsule made of stainless steel or the like and evacuated to a vacuum, placing the capsule into an HIP treating container, and subjecting the capsule to a high isostatic pressure (e.g., of 100 kgf/cm$^2$) at a high temperature (e.g., 1000° C.) using, for example, argon gas (Ar gas) as a pressure medium to compact the zircaloy cladding hulls into a solid metal block of high density.

The zircaloy cladding hulls to be treated by the conventional compacting method with the use of the HIP have occluded therein tritium $^3$H), radioactive isotope of hydrogen, in an amount of 60% of the amount thereof produced in the reactor. At a high temperature, the tritium is released from the hulls and then penetrates through the capsule, contaminating the pressure medium, i.e., Ar gas, and the HIP treating container. Consequently, the conventional method requires aftertreatments of a large quantity of Ar gas and the container to remove the contaminant tritium, necessitating much labor for these procedures.

The same problem will be encountered with the compacting method utilizing the HP.

SUMMARY OF THE INVENTION

The main object of the present invention is to provide a method of compacting radioactive metal wastes free of the conventional problem of permitting tritium to penetrate through and to be released from the capsule so as to achieve savings in labor for the aftertreatment following the compacting treatment.

The present invention provides a method of compacting radioactive metal wastes by enclosing the radioactive metal waste in vacuo in a capsule, placing the capsule into a pressure container, and subjecting the capsule to an increased pressure at a high temperature to compact the waste. The compacting treatment is conducted in a state in which the atmosphere within the pressure container contains water molecules in an amount, in terms of the total weight W (g) thereof, greater than the water content of the air, the amount being preferably in the range of:

$$1.3 \times 10^{-6} \times V \leq W$$

wherein V (cm$^3$) is the volume of the compacting space in the pressure container.

With the method described above, the atmosphere within the pressure container contains H$_2$O molecules, so that the compacting treatment forms an oxide coating on outer surface of the capsule. The tritium from the metal waste inside is prevented from penetrating through the capsule and from being released from the capsule outside by the oxide coating, whereby the contamination of the pressure container itself and the pressure medium therein can be precluded with ease. This reduces or eliminates the work needed to remove the contaminant from the pressure container and to treat the pressure medium after the compacting treatment.

The present invention further provides a method of compacting radioactive metal wastes by enclosing the radioactive metal waste in vacuo in a capsule, placing the capsule into a pressure container, and subjecting the capsule to an increased pressure at a high temperature to compact the waste, the method being characterized in that an oxide coating is formed on the outer surface of the capsule before the capsule is placed into the pressure container.

With this method, the oxide coating is formed on the outer surface of the capsule before the compacting treatment, so that the oxide coating prevents tritium from penetrating through and being released from the capsule with the start of the compacting treatment. This readily reduces or eliminates the work needed to remove the contaminant from the pressure container and to treat the pressure medium after the compacting treatment.

The present invention further provides a method of compacting radioactive metal wastes by enclosing the radioactive metal waste in vacuo in a capsule, placing the capsule into a pressure container, and subjecting the capsule to an increased pressure at a high temperature to compact the waste, wherein an oxide coating is formed on the outer surface of the capsule before the capsule is placed into the pressure container, and the compacting treatment is conducted in a state in which the atmosphere within the pressure container contains water molecules in an amount, in terms of the total weight W (g) thereof, greater than the water content of the air, the amount being preferably in the range of:

$$1.3 \times 10^{-6} V \leq W$$

wherein V (cm$^3$) is the volume of the compacting space in the pressure container.

With this method, the oxide coating is formed on the outer surface of the capsule before the compacting treatment, and the compacting treatment fortifies the oxide coating with the H$_2$O molecules in the atmosphere inside the container. As a result, the penetration of tritium can be prevented more effective to reliably precludes the release thereof. This readily reduces or eliminates the work needed to remove the contaminant from the pressure container and to treat the pressure medium after the compacting treatment.

The above and other objects, features and advantages of the present invention will become more apparent upon a reading of the following detailed description and the accompanying drawings.

DESCRIPTION OF THE PREFERRED EMBODIMENTS

Figure 1:
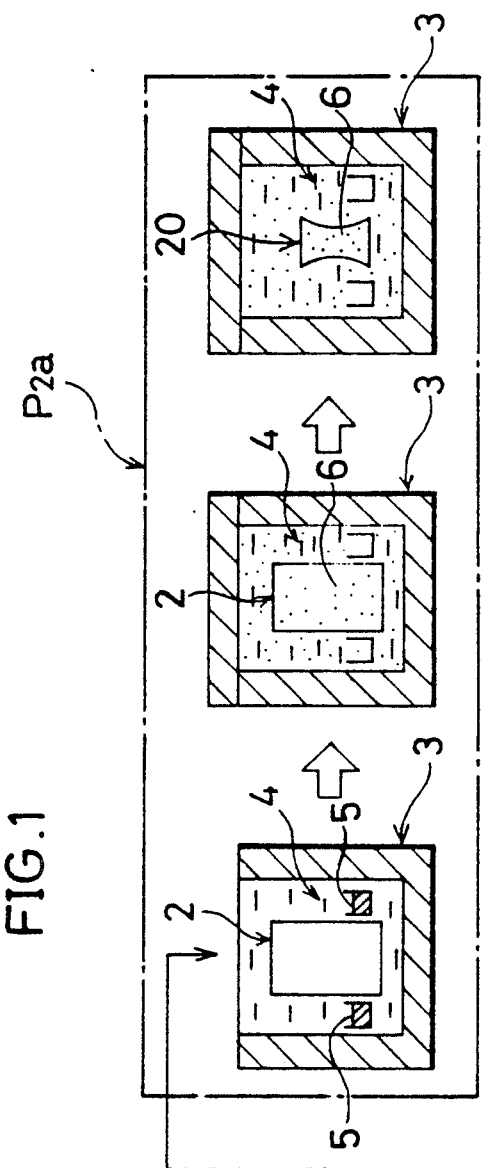
FIG. 1 is a process diagram showing a first embodiment of the invention.
Figure 2:
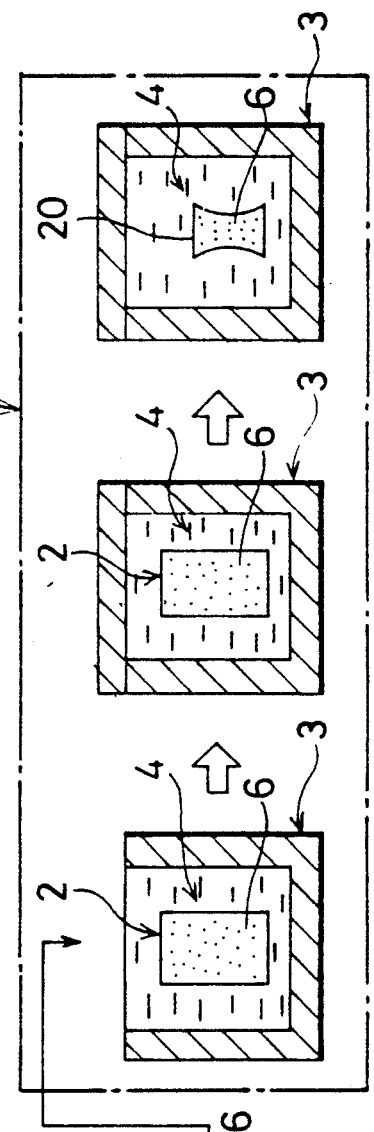
FIG. 2 is a process diagram showing a second embodiment of the invention.
Figure 3:
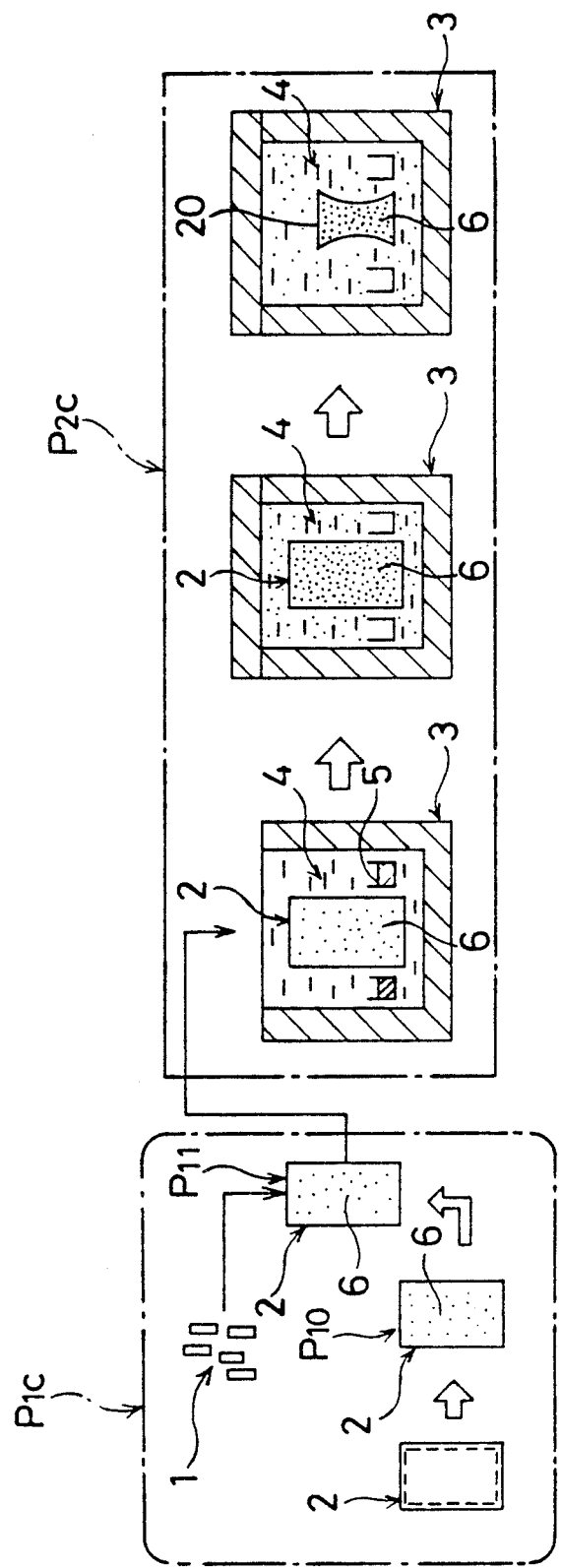
FIG. 3 is a process diagram showing a third embodiment of the invention.

FIGS. 1 to 3 show three embodiments according to the present invention, which consist essentially of the step P1a, P1b or P1c of enclosing zircaloy cladding hulls (radioactive metal wastes) 1, such as fuel claddings of zircaloy, in a capsule 2, and the step P2a, P2b or P2c of compacting the capsule 2 by an HIP.

The first embodiment will be described with reference to FIG. 1. In the encapsulating step P1a, zircaloy cladding hulls 1 are placed into the capsule 2 made of stainless steel or the like, which is then evacuated to enclose the hulls therein (enclosing step P11).

In the subsequent compacting step P2a, the capsule 2 is placed into an HIP container (pressure container) 3, which is then filled with Ar gas 4 and sealed off. Placed in the vicinity of the capsule 2 within the HIP container 3 is a specified quantity of a hydroxide (such as calcium hydroxide $Ca(OH)_2$) 5 serving as a water generating agent for producing water molecules ($H_2O$) when heated.

The interior of the HIP container 3 is then heated (for example, to 1000° C.), and the Ar gas 4 is pressurized (for example, to 100 kgf/cm$^2$) to serve as a pressure medium. When thus heated, the calcium hydroxide produces in the Ar gas within the container 3 $H_2O$, which forms an oxide coating 6 of chromium oxide over the outer surface of the capsule 2. With the oxide coating 6 thus formed, the capsule 2 is compacted into a solid metal body 20 of high density.

The tritium released from the zircaloy hulls 1 and penetrating into the wall of the capsule 2 is predominantly prevented from further penetration by the oxide coating 6 in the step P2a, whereby the contamination of the Ar gas and the inner surface of the HIP container 3 with the tritium can be precluded. Presumably, this is attributable to the following reasons. Tritium and deuterium have the nature of penetrating through stainless steel, carbon steel and the like at high temperatures but encountering difficulty in diffusing (migrating) through the oxide coating 6. Furthermore, upon tritium passing through steel in the form of atoms, the atoms need to bond together into molecules at the surface of steel for the tritium to be released therefrom, whereas the oxide coating 6 prevents this bonding reaction. Unlike the conventional method, the present method therefore reduces or eliminates the work needed to remove the contaminant from the Ar gas 4 and the HIP container 3 after the compacting step.

The total weight W (g) of $H_2O$ to be present in the Ar gas 4 within the HIP container 3 is in the range of:

$$1.3 \times 10^{-6} \times V \leq W$$

wherein V (cm$^3$) is the compacting capacity in volume of the container 3. The compacting capacity V means the volume of interior space of the HIP container 3 minus the volume of the capsule 2, i.e., the volume of the compacting space in the container 3. Accordingly, when a plurality of capsules are placed into the container 3, the capacity V is the volume of the interior space minus the total volume of the capsules.

If the amount of $H_2O$ to be present is smaller than the lower limit, the amount is comparable to traces of $H_2O$ which are usually present in the pressure medium, i.e., Ar gas, and on the surface of the capsule 2 and on the inner surface of the container 3 as in the case of the conventional method. Accordingly, the amounts less than the lower limit are excluded. Further with an increase in the amount of $H_2O$, the quantity of oxide coating 6 formed increases, whereas if the amount increases beyond a certain value, the quantity of oxide coating 6 will not increase in proportion to the amount of $H_2O$. Moreover, in this case, the presence of a large amount of $H_2O$ forms an oxide on the inner surface of the HIP container 3, heater, etc., so that an excess of $H_2O$ is unnecessary when forming the oxide coating 6 over the capsule 2.

Next, the second embodiment will be described with reference to FIG. 2. The encapsulating step P1b of the second embodiment comprises a pretreating step P10 and an enclosing step P11. In the pretreating step P10, an oxide coating 6 is formed on the outer surface of a capsule 2 before the compacting step P2b. The enclosing step P11 is thereafter conducted in the same manner as the enclosing step P11 (see FIG. 1) of the first embodiment.

The pretreating step P10 can be carried out selectively by one of various methods, i.e., a heat treatment wherein the capsule 2 is heated in the air or steam, a treatment for forming a passive state film by immersing the capsule 2, for example, in a solution of nitric acid when the capsule is made of stainless steel, or a treatment wherein the capsule 2 is immersed in a hot alkali solution, for example, of sodium hydroxide (NaOH) when the capsule is made of carbon steel.

After the completion of the enclosing step P11, the capsule 2 is placed into an HIP container 3, which is then filled with Ar gas and sealed off in the compacting step P2b. The interior of the HIP container 3 is heated (for example, to 1000° C.), and the Ar gas 4 is pressurized (for example, to 100 kgf/cm$^2$) to serve as a pressure medium, whereby the capsule 2 formed with the oxide coating 6 is compacted into a solid metal block 20 of high density.

According to the second embodiment, the oxide coating 6 is formed over the outer surface of the capsule 2 before the compacting step P2b, so that the heating of the compacting step P2b is conducted with the oxide coating 6 already formed over the capsule 2. Consequently, tritium can be prevented from penetration and release initially from the start of the compacting step P2b. Accordingly, in the case where the conditions are so set that the oxide coating 6 eventually formed in the first embodiment and the oxide coating 6 formed in the pretreating step P10 are comparable to each other, the contamination of the Ar gas 4 and the inner surface of the HIP container 3 with tritium is less in the second embodiment than in the first embodiment because during the heat treatment in the compacting step P2a of the first embodiment, the oxide coating 6 is formed simultaneously with the heating, with the resulting likelihood that the tritium from the zircaloy cladding hulls will penetrate through and escape from the capsule before the oxide coating 6 is fully formed. The work to be performed after the compacting step to remove the contaminant from the Ar gas and the HIP container 3 in the second embodiment can therefore be less than is the case with the first embodiment.

Next, the third embodiment will be described with reference to FIG. 3. According to the third embodiment, the encapsulating step P1c is the same as the encapsulating step P1b of the second embodiment, and the compacting step P2c is the same as the compacting step P2a of the first embodiment. Thus, the third embodiment is adapted to achieve an enhanced effect to prevent the penetration and release of tritium by forming an oxide coating 6 over the outer surface of a capsule 2 before the compacting step P2c and fortifying the oxide coating 6 by the presence of $H_2O$ in the atmosphere of an HIP container 3 in the compacting step P2c.

Although the compacting treatment of the first to third embodiments described employs HIP, HP may alternatively be used for compacting. The capsule 2 is made of stainless steel according to the first to third embodiments, whereas the capsule may alternatively be made of carbon steel. In this case, an iron oxide forms an oxide coating over the outer surface of the capsule to prevent the penetration and release of tritium.

Further according to the foregoing first to third embodiments, a water generating agent which produces $H_2O$ when heated is used as means for forming the oxide coating 6 on the outer surface of the capsule 2 within the HIP container 3. Besides the agent, also usable is an oxide which produces oxygen on decomposition when heated, such as $Fe_3O_4$, $NiO$ or $Cu_2O$.

A description will now be given of the tests conducted to substantiate the advantages of the invention and the test results achieved. Two kinds of samples were used: occulusion samples which were zircaloy tubes having occluded therein deuterium, an isotope of tritium, and non-occlusion samples free from deuterium. The capsules used were of two kinds: those made of stainless steel, and those made of carbon steel. The sample-enclosing capsule was compacted by one of the methods of the invention illustrated in FIGS. 1 to 3 and a conventional method wherein HIP treatment was merely conducted. The amount of deuterium in the occlusion sample was measured before and after the compacting treatment. Table 1 shows the results.

Deuterium was selected for use because it is easy and safe to handle and further because it is higher than tritium in diffusion velocity, permitting evaluation of safety. The occlusion sample was prepared by subjecting the zircaloy tube to a deuterium immersion treatment in an autoclave at 300° C. for at least 40 hours and thereby causing the tube to occlude about 650 to about 670 ppm of deuterium.

About 100 to about 200 g of samples were placed into the capsule, about 20 to about 30 mm in outside diameter and about 40 to about 50 mm in height, which was then evacuated to 0.2 torr to enclose the samples therein. For the pretreating step P10, four methods were used which were heat treatment in steam, heat treatment in the air, passive film forming treatment with use of a nitric acid solution (for stainless steel capsules), and hot alkali solution immersion treatment with use of a sodium hydroxide solution (for carbon steel capsules). The HIP compacting treatment was conducted at an increased pressure of 100 atm. with heating at 1000° C. using an HIP container having a compacting capacity V of about 3700 $cm^3$ and Ar gas as a pressure medium.

Distilled water or $Ca(OH)_2$ was used as the water generating agent for causing the inside atmosphere of the HIP container to contain $H_2O$. The agent was used in varying amounts so that the container atmosphere contained $1.35 \times 10^{-6}$ to $2.7 \times 10^{-4}$ $g/cm^3$ of $H_2O$ based on the compacting capacity V ($cm^3$).

The HIP compacting step was conducted with a pair of capsules placed in the HIP container, one of the capsules enclosing occlusion samples therein, and the other capsule enclosing non-occlusion samples for the following reason. Zircaloy has the nature of occluding a large quantity of hydrogen when in an atmosphere having a trace of hydrogen partial pressure at high temperatures. In other words, in the case where zircaloy occluding a large quantity of hydrogen is heated at a high temperature, an equilibrium is reached when a slight hydrogen partial pressure is produced in the atmosphere by the hydrogen released from the zircaloy, permitting no further release of hydrogen.

For example, the hydrogen partial pressure reaching an equilibrium with an amount of occlusion of 600 ppm is generally estimated to be up to 10 torr at 1000° C. When the compacting treatment of the present test is conducted for the occlusion sample only, the reduction achieved in the quantity of deuterium in the occlusion sample is estimated at about 10 ppm if greatest. However, in measuring quantities of deuterium, the measurement is likely to readily vary by such a quantity depending on the deuterium sampling position, so that it is difficult to accurately determine the amount of released deuterium (reduction) from the measurements obtained before and after the compacting treatment, if the occlution sample alone is used.

To overcome the difficulty, a capsule enclosing occlusion samples and a capsule enclosing non-occlusion samples were compacted at the same time in the present test, thereby accelerating the release of deuterium from the occlusion samples and absorption of the hydrogen to the non-occlusion samples. In this way, the release of deuterium from the occlusion samples is amplified in the test, with the result that the behavior of deuterium released during the compacting treatment can be determined with ease.

Figure 4:
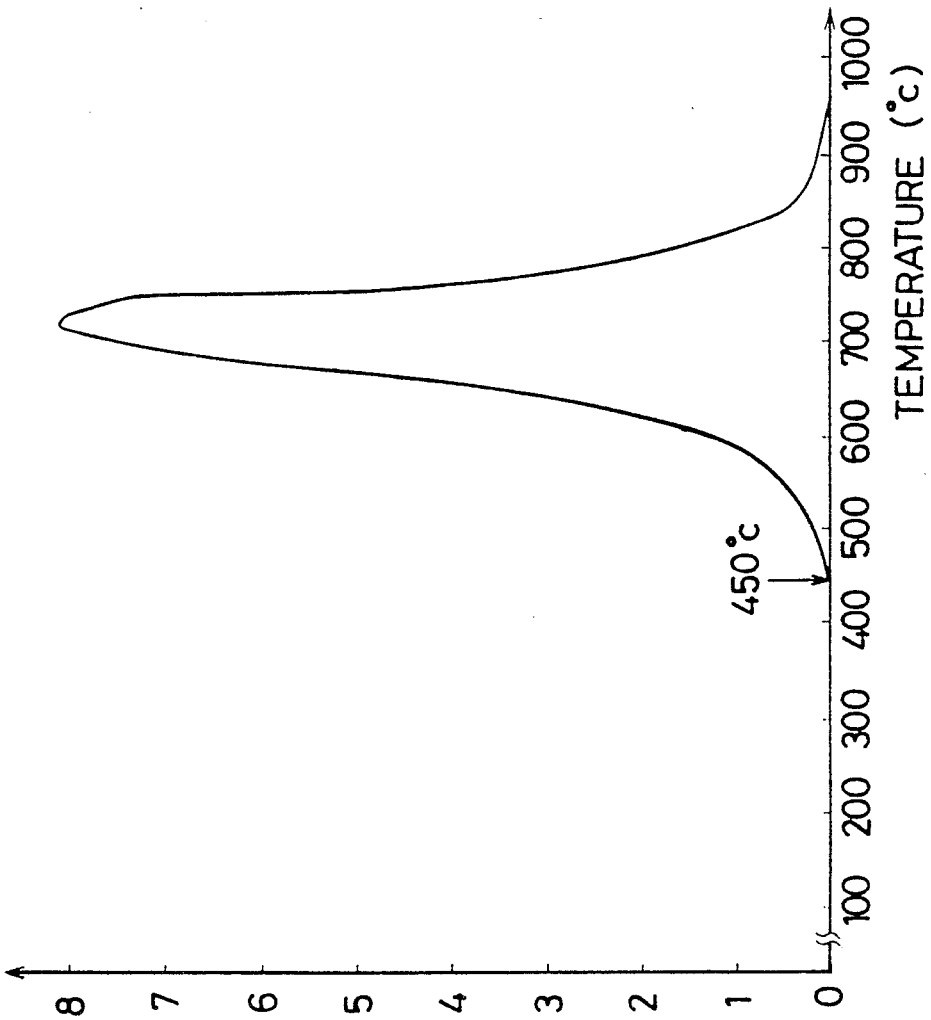
FIG. 4 is a diagram showing the relationship between the amount of released deuterium and the temperature.

Prior to the testing, a preliminary test was performed to check the temperature dependence of the release of deuterium from the occlusion sample. FIG. 4 shows the result. The preliminary test was conducted by placing the occlusion sample into a quartz tube, fully evacuating the tube, thereafter starting to heat the tube and raising the temperature to 1000° C. while measuring the amount of released deuterium with a mass spectrometer. With reference to FIG. 4, the test revealed that the sample started to release deuterium at 450° C. and ceased to release any deuterium at 1000° C. after completely releasing the occluded deuterium. Accordingly, the behavior of release of deuterium from the sample can be evaluated by heating the sample to 1000° C.

TABLE 1

| Test No. | Amount of $^2H$ (ppm) Before treatment | Amount of $^2H$ (ppm) After treatment | Kind of steel for capsule | Adjustment of atmosphere $H_2O$ content ($g/cm^3$) and $H_2O$ generating agent | Pretreatment and pretreating conditions |
|---|---|---|---|---|---|
| 1 | 667 | 305 | S | No | No |
| 2 | 667 | 284 | C | No | No |
| 3 | 679 | 588 | S | $1.35 \times 10^{-6}$, $Ca(OH)_2$ | No |
| 4 | 679 | 521 | C | $1.35 \times 10^{-6}$, $Ca(OH)_2$ | No |
| 5 | 660 | 638 | S | $1.35 \times 10^{-6}$, $Ca(OH)_2$ | No |

TABLE 1-continued

| Test No. | Amount of $^2H$ (ppm) Before treatment | Amount of $^2H$ (ppm) After treatment | Kind of steel for capsule | Adjustment of atmosphere $H_2O$ content (g/cm$^3$) and $H_2O$ generating agent | Pretreatment and pretreating conditions |
|---|---|---|---|---|---|
| 6 | 660 | 662 | S | $2.7 \times 10^{-5}$, Ca(OH)$_2$ | No |
| 7 | 660 | 671 | S | $2.7 \times 10^{-4}$, distilled water | No |
| 8 | 660 | 642 | C | $2.7 \times 10^{-5}$, Ca(OH)$_2$ | No |
| 9 | 665 | 645 | S | No | Heating in steam, 1000° C., 1 H |
| 10 | 665 | 671 | S | $1.35 \times 10^{-5}$, Ca(OH)$_2$ | Heating in steam, 1000° C., 1 H |
| 11 | 665 | 644 | S | No | Heating in steam, 350° C., 5 H |
| 12 | 665 | 669 | S | $1.35 \times 10^{-5}$, Ca(OH)$_2$ | Heating in steam, 350° C., 5 H |
| 13 | 665 | 602 | C | No | Heating in steam, 350° C., 5 H |
| 14 | 671 | 619 | S | No | Heating in air, 500° C., 5 H |
| 15 | 671 | 680 | S | $2.7 \times 10^{-5}$, distilled water | Heating in air, 500° C., 5 H |
| 16 | 671 | 621 | S | No | Passive film forming treatment |
| 17 | 671 | 683 | S | $2.7 \times 10^{-5}$, distilled water | Passive film forming treatment |
| 18 | 652 | 597 | C | No | Heating in steam, 350° C., 5 H |
| 19 | 652 | 604 | C | No | Immersion in alkali soln., 100° C. |

Note:
(1) S for the capsule steel stands for stainless steel, and C for carbon steel.
(2) The passive film forming treatment in the pretreatment was conducted by immersion in a nitric acid solution.
(3) The alkali solution used for the pretreatment was NaOH solution.

The test results will be discussed with reference to Table 1.

Tests No. 1 and No. 2 were conducted by the conventional method wherein the pretreatment and the adjustment of the compacting atmosphere were not performed. In these cases, a relative large amount of deuterium was released. However, the deuterium remained partly unremoved without being completely released, presumably because traces of water adhering to the inner surface of the HIP container and the outer surface of the capsule formed on the outer surface of the capsule a very thin oxide coating, which acted to inhibit the release of deuterium.

Tests No. 3 to No. 8 were conducted by the method of the first embodiment shown in FIG. 1, Tests Nos. 9, 11, 13, 14, 16, 18 and 19 by the method of the second embodiment shown in FIG. 2, and Tests Nos. 10, 12, 15 and 17 by the method of the third embodiment of FIG. 3.

Tests No. 3 to No. 8 (conducted by the method of the first embodiment) were performed at varying $H_2O$ contents of $1.35 \times 10^{-6}$ to $2.7 \times 10^{-4}$ g/cm$^3$ (about 0.005 to about 1 g in the total amount of water) using capsules of two different kinds of steels. The results of these test reveal the following. Tests Nos. 3 to 5 in which the $H_2O$ content was relatively low resulted in slight decreases in the amount of deuterium. The higher the $H_2O$ content, the greater was the effect to prevent the release of deuterium. Especially in Tests No. 6 and No. 7, no release (reduction) of deuterium occurred, hence complete prevention of penetration and release of deuterium. In these Tests No. 6 and No. 7, the values are greater after the treatment than before the treatment; this appears attributable to measuring errors. A comparison between Tests No. 3 and No. 4, or between Tests No. 6 and No. 8 indicates that stainless steel is more effective than carbon steel for preventing the release of deuterium.

In Tests Nos. 9, 11, 13, 14, 16, 18 and 19 (by the method of the second embodiment), capsules of two kinds of steels were pretreated by heating in steam, heating in the air, passive state film forming or immersion in a hot alkali solution and thereafter compacted without adjusting the inside atmosphere of the HIP container. The test results reveal that although the compacting operation reduced the amount of deuterium, the reductions were small, indicating the effect of the pretreatment to prevent release of deuterium. In respect of the capsule materials, the method of the second embodiment, like the first embodiment, achieved a greater effect to prevent the release of deuterium with use of stainless steel than with carbon steel.

In Tests Nos. 10, 12, 15 and 17 (by the method of the third embodiment), capsules were compacted by the combination of the pretreatment and the adjustment of the inside atmosphere of the HIP container. The test results indicate that no reduction in the amount of deuterium occurred even when the water content of the atmosphere was relatively as low as $1.35 \times 10^{-5}$ g/cm$^3$ (Tests Nos. 10 and 12) and that the release of deuterium was completely prevented in all the tests wherein the pretreatment was conducted in combination with the water content adjustment of the atmosphere.

Although the present invention has been fully described by way of example with reference to the accompanying drawings, it is to be understood that various changes and modifications will be apparent to those skilled in the art. Therefore, unless otherwise such changes and modifications depart from the scope of the invention, they should be construed as being included therein.

What is claimed is:

1. A method of compacting radioactive metal wastes, comprising the steps of:
   enclosing the radioactive metal waste in vacuo in a capsule,
   placing the capsule into a pressure container,
   subjecting the capsule to an increased pressure at high temperature to compact the waste, and
   increasing water vapor content of the atmosphere in the pressure container at a time no later than said step of subjecting the capsule to an increased pressure.

2. A method of compacting radioactive metal wastes, comprising the steps of:
   enclosing the radioactive metal waste in vacuo in a capsule,
   placing the capsule into a pressure container,
   subjecting the capsule to an increased pressure at a high temperature to compact the waste, and forming an oxide coating on the outer surface of the capsule before the capsule is placed into the pressure container.

3. A method of compacting radioactive metal wastes, comprising the steps of:
   enclosing the radioactive metal waste in vacuo in a capsule,
   placing the capsule into a pressure container.
   subjecting the capsule to an increased pressure at a high temperature to compact the waste,
   increasing water vapor content of the atmosphere in the pressure container at a time no later than said step of subjecting the capsule to an increased pressure, and
   forming an oxide coating on the outer surface of the capsule before the capsule is placed into the pressure container.

4. A method as defined in claim 1 or 3 wherein said step of increasing the water vapor content of the atmosphere in said pressure container comprises increasing the amount of water molecules in terms of the total weight W (g) thereof to be in the range of:

$$1.3 \times 10^{-6} \times V \leqq W$$

wherein V ($cm^3$) is the volume of the compacting space in the pressure container.

5. A method as defined in claim 2 or 3 wherein the oxide coating step comprises heating the capsule in the air or steam.

6. A method as defined in claim 2 or 3 wherein the capsule is made of stainless steel, and the oxide coating step comprises immersing the capsule in an oxidizing agent to thereby form a passive state film.

7. A method of defined in claim 2 or 3 wherein the capsule is made of carbon steel, and the oxide coating step comprises immersing the capsule in a hot alkali solution.

* * * * *